Dec. 15, 1942.   P. W. EMGE   2,305,069
MEANS OF ATTACHING SERVICE WIRES
Filed May 4, 1938   2 Sheets-Sheet 1
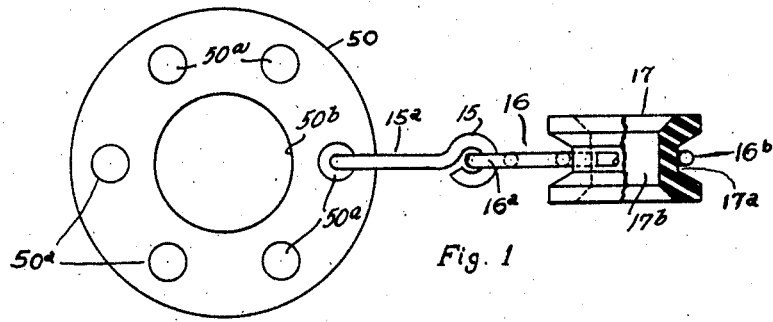
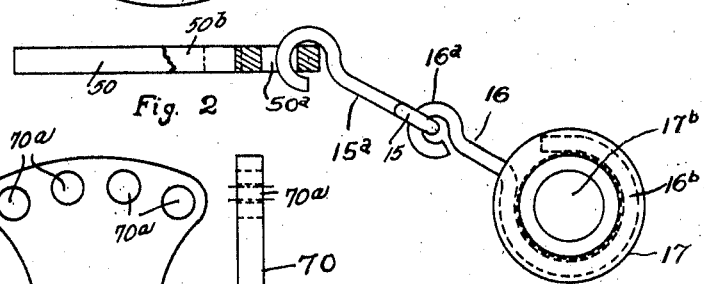
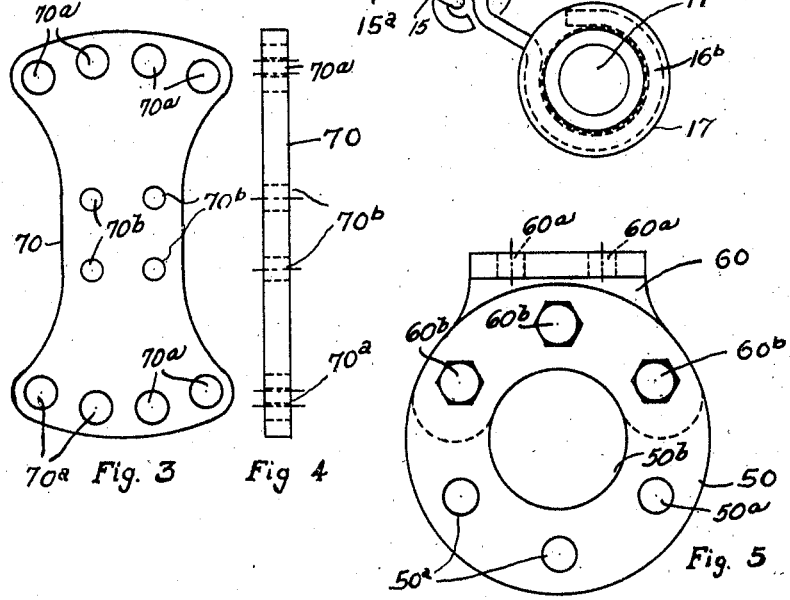
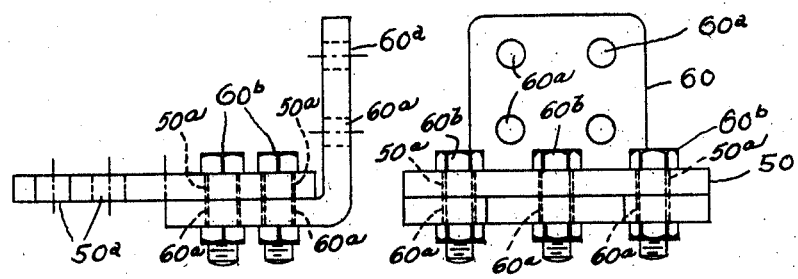
Inventor
Paul. W. Emge Dec. 15, 1942.  P. W. EMGE  2,305,069
MEANS OF ATTACHING SERVICE WIRES
Filed May 4, 1938  2 Sheets-Sheet 2

Inventor
Paul W. Emge

Patented Dec. 15, 1942

2,305,069

UNITED STATES PATENT OFFICE 2,305,069

MEANS OF ATTACHING SERVICE WIRES

Paul W. Emge, Miami, Fla.

Application May 4, 1938, Serial No. 206,018

2 Claims. (Cl. 174—149)

This invention relates to adapters and connectors, and, particularly to those adapters used on outside service wires.

In connecting or disconnecting a service wire, or wires, on a pole, the lineman sometimes comes in contact with the live wires where the insulation may be worn off. With the present type of connection, the difficulty in avoiding such wires is made greater by the necessity for winding the service wire around an insulator, which already supports the live wire.

It is the primary object of this invention to obviate the difficulties, inconveniences and dangers incident to the above, hitherto necessary procedure. According to this invention as herein illustrated and described, any part of a power transmission system such as the cross arm, insulator, pins, racks, or any part bearing the live wire may be removed or replaced without any interruption of service to the customer.

Another object of the invention, is to assure a positive disconnection or isolation of service wires from the current carrying wires, which disconnection is not always accomplished by the present method of connection. If the insulation becomes worn from the portions of the wires which are wound around the insulator, they will still have contact, even though an end of the service wire be detached from the line wire, and the service wire will carry current away from the line wire when it is not intended to do so.

Another object of the invention is to provide for safe attachment of wires of opposite polarity to the same adapter plate, without any danger of the wires becoming crossed or short circuited, and thus to eliminate the necessity for wires to cross each other to reach their destination.

Still another object of the invention is to keep all service wires from being wound around the insulator, and thereby, relieve the strain on the insulator conductor, reducing the hazard of a broken insulator, causing a fire, or accident to the lineman.

Still another object of the invention is to provide a means of quickly locating the several wires to a building, and a quick method of disconnecting and removing the wires in case of a fire, with a minimum of hazard to a workman, and also still not interrupt another customer's service. Under the present means of connection the wires are sometimes cut down from the wrong building on account of the inability of the lineman to segregate the wires, where more than one wire is wound around the insulator.

Still another object of the invention is to decrease the expense in replacing any part of the current carrying equipment. Under the present method the customer's service wires must all be disconnected from the main wire, and unwound from the insulator, while replacing any parts such as cross arms, pins, insulator, service rack, or any other supporting devices.

Other and further objects and advantages of the invention will be apparent to those skilled in the art from the following specification and claims.

Referring to the drawings wherein I have illustrated an embodiment of the invention.

Fig. 1 is an assembly view of an adapter plate, connector insulator, and hook according to this invention.

Fig. 2 is a partial cross section of the adapter plate, connector insulator, and hook of Fig. 1, illustrating the method of securing the hook to the adapter plate.

Fig. 3 is a top plan view of a modified adapter plate, adapted particularly for installation on a cross arm.

Fig. 4 is a side view of the adapter plate shown in Fig. 3.

Fig. 5 is a top plan view of the adapter plate of Fig. 1 and an auxiliary bracket for attaching it to surfaces disposed at 90 degree angles to the plane thereof.

Fig. 6 is a side elevation of the adapter plate and auxiliary bracket and illustrating method of attaching the plate and adapter together.

Fig. 7 is a front elevation of the adapter plate and auxiliary bracket, showing the method of securing the auxiliary bracket to surfaces disposed at 90 degrees to the plane of the adapter plate.

Similar reference characters refer to the same or similar parts throughout the specification and drawings.

Figure 8:
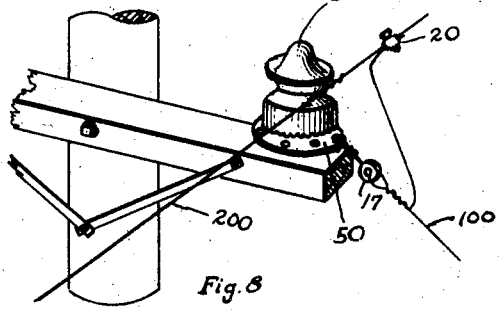

Referring to Figs. 1, 2, 5, 6, the adapter plate or ring of the invention is designated 50 and is provided with a circular central aperture 50b. Equidistantly spaced in the annular portion of the adapter plate are apertures or openings 50a adapted to receive the end eye of connector hooks 15a. The opposite end eye 15 has secured thereto the eye 16a of a somewhat similar insulator connector hook 16. At its opposite end, the insulator connector hook 16 is provided with a loop 16b which substantially surrounds the insulator 17 and lies in the groove 17a thereof, holding the insulator in place to receive through its opening 17b the service wire, which may be the lead-in wire to a building. A suitable means such as a connector clamp is provided to secure the service or lead-in wire to the main line wire.

Fig. 7 shows an assembly or front elevation view of adapter plate 50, and auxiliary bracket 60, having openings 60a for bolts or other means for securing it to a surface; also shown are bolts 60b extending through the openings or apertures 60a and 50a for securing the adapter plate and auxiliary bracket together.

Fig. 5 also shows the adapter plate or ring 50 secured to the auxiliary bracket 60 by means of bolts 60b which extend through apertures 50a in the adapter plate 50 and apertures 60a in the auxiliary bracket 60.

Fig. 3 shows the modified adapter plate described above and the provision therein at each end, of openings or apertures 70a for receiving the hook 16a of the insulator connector hook 16 or the end eye of the hook 15a. Also shown are the openings or apertures 70b disposed adjacent the central portion of the adapter plate 70 for securing the adapter plate to a parallel surface by means of bolts or the like. It will be noted that the openings or apertures 70a are disposed equidistantly and radially with respect to the center of the plate 70 as are also the openings or apertures 50a disposed equidistantly and radially with respect to the center of the adapter plate 50b.

Figure 9:
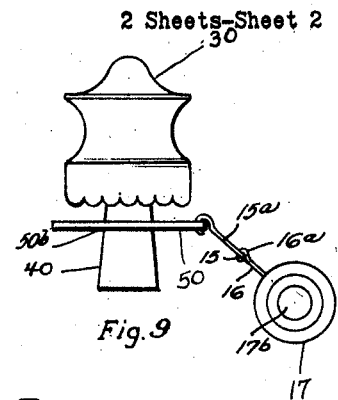

Figs. 8 and 9 illustrate a preferred method of using the adapter plate 50. As therein shown, the central aperture 50b of the adapter plate surrounds the insulator pin 40 which is disposed beneath the insulator 30. As shown, the insulator 17 is attached to the adapter ring 50 by means of hooks 15a, 16 as shown in Figs. 1 and 2. The service wire 100 is served through the aperture 17b in insulator 17 and thence connected to the line wire 200 by the solderless connector 20.

Figure 10:
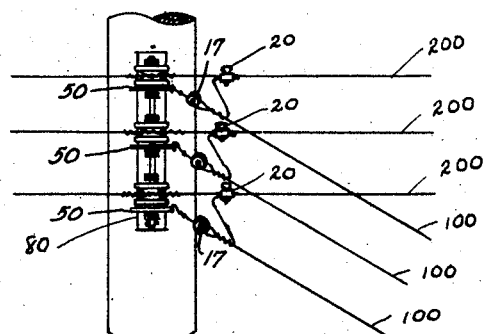
Figure 11:
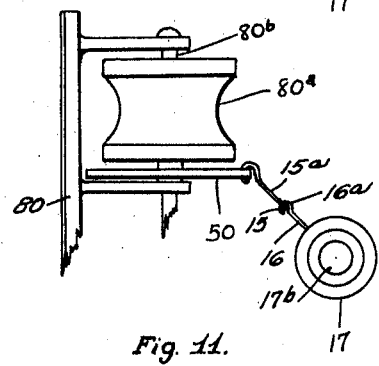

Figs. 10 and 11 illustrate a preferred method of using the adapter plate 50, as applied to a standard secondary rack 80. Service wires are attached to the line in the same manner as in Fig. 8.

Figure 12:
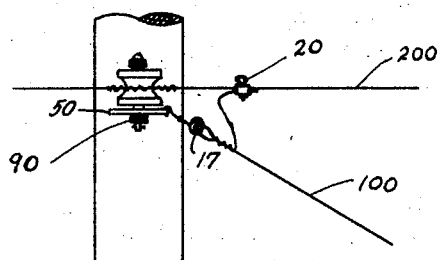
Figure 13:
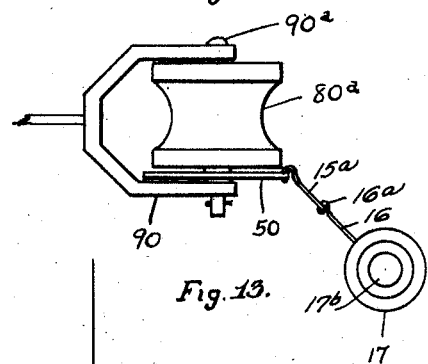

Figs. 12 and 13 illustrate the application of the adapter plate 50 to a standard secondary fork 90, and the service wires are attached to the line in the same manner as in Figs. 1 and 3.

Figures 14, 15:
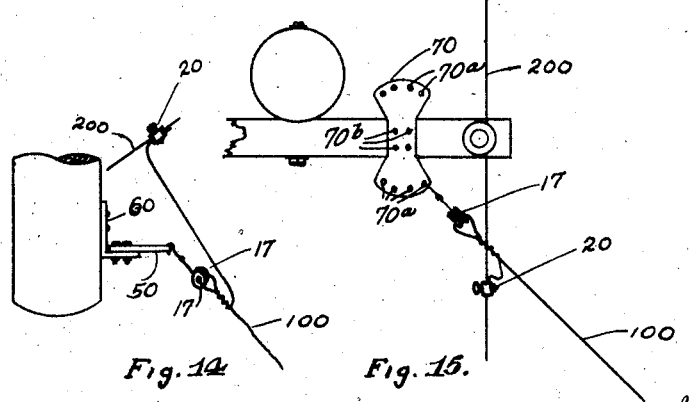

Fig. 14 illustrates the preferred method of using the adapter plate 50 with angle plate 60 shown in Figs. 5, 6 and 7, when it is not desired to secure the adapter to an insulator pin, fork, or rack.

Fig. 15 illustrates the preferred method of use of the modified form of adapter plate 70 shown in Figs. 3 and 4 and described above. Fig. 15 shows the adapter plate 70 attached to the upper, flat, surface of a conventional cross arm with the attachment achieved by the use of suitable means through apertures 70b. The figure illustrates the disposition of the apertures 70a at opposite sides of the supporting cross arm. This modified form of adapter plate 70 is particularly adapted for attachment to flat surfaces as distinguished from the adapter plate 50 which adapter plate 50 is more particularly adapted for use with insulator pins such as 40 (Figs. 8 and 9), forks 90 (Figs. 12 and 13) or racks such as 80 (Figs. 10 and 11).

In Figs. 11 and 13, 80a designates a standard or conventional spool type insulator adapted for use on various forms of racks such as 80, forks such as 90 and similar devices for supporting secondary or service conductors or wires.

Fig. 11 illustrates the support of the adapter plate 50 by the insulator pin 80b which also supports the above described spool insulator 80a. As shown in Fig. 11, the insulator pin 80b is engaged by the annular wall of the central aperture 50b of the adapter plate 50.

Fig. 13 illustrates the method of supporting such spool insulators as above described within a fork 90 and also illustrates the provision by the insulator supporting pin 90a of common support for the spool insulator 80a of the adapter plate 50.

While I have described in detail certain embodiments of my invention, I desire to have it understood that the disclosure is merely illustrative and that modifications and changes may be made without departing from the spirit of the invention and within the scope of the appended claims.

Having described my invention, what I desire to secure by Letters Patents is:

1. A universal support for service wires comprising a substantially C-shaped bracket having substantially parallel upper and lower arms, the closed end of said bracket being adapted for securing to a telegraph pole, a spool-type insulator for supporting a power transmission line, a pin extending through said insulator, the ends of said pin extending through the free ends of said arms for mounting said insulator on said bracket, and means for supporting service wires for attachment to the power transmission line, comprising an annular integral flat plate member having a radius less than the length of said lower arm, a circular central opening, said plate member being mounted between the lower end of said insulator and said lower arm with said pin passing through said circular central opening, said plate member having a plurality of circumferentially spaced apertures therethrough, said apertures being radially outward of the lower periphery of said insulator, a second insulator for supporting a service wire, and articulated connector hook means having one end secured to said second insulator and the other end hooked through one of said apertures.

2. A universal support as claimed in claim 1, said circular central opening being of greater diameter than said pin, whereby to allow rotation of said annular plate member.

PAUL W. EMGE.